United States Patent
Morishima

(10) Patent No.: US 6,912,188 B2
(45) Date of Patent: Jun. 28, 2005

(54) OPTICAL DISK RECORDING METHOD

(75) Inventor: Morito Morishima, Fukuroi (JP)

(73) Assignee: Yamaha Corporation, Hamamatsu (JP)

( * ) Notice: Subject to any disclaimer, the term of this patent is extended or adjusted under 35 U.S.C. 154(b) by 494 days.

(21) Appl. No.: 10/223,180

(22) Filed: Aug. 19, 2002

(65) Prior Publication Data

US 2003/0035355 A1 Feb. 20, 2003

(30) Foreign Application Priority Data

Aug. 20, 2001 (JP) ........................................ 2001-248645

(51) Int. Cl.$^7$ ................................................ G11B 7/00
(52) U.S. Cl. .................... 369/47.53; 369/53.1; 369/59.1
(58) Field of Search ............................... 369/47.1, 47.5, 369/47.51, 47.53, 47.55, 53.1, 53.11, 59.1, 59.11, 116

(56) References Cited

U.S. PATENT DOCUMENTS

| | | | | | |
|---|---|---|---|---|---|
| 5,226,027 | A | * | 7/1993 | Bakx | 369/47.55 |
| 5,629,913 | A | * | 5/1997 | Kaku et al. | 369/47.52 |
| 6,480,450 | B1 | * | 11/2002 | Fujii et al. | 369/59.12 |

* cited by examiner

*Primary Examiner*—Muhammad Edun
(74) *Attorney, Agent, or Firm*—Pillsbury Winthrop Shaw Pittman LLP

(57) ABSTRACT

For an optical disk for which a record strategy is not prepared in a memory and an optical disk which cannot obtain a good signal quality by using the record strategy prepared in the memory, test recording is performed by using all record strategies prepared in the memory or properly adopted record strategies by changing the record power. A record strategy providing a relatively high signal quality is selected to record data in the optical disk. The record strategies for such optical disks can be easily set.

9 Claims, 10 Drawing Sheets

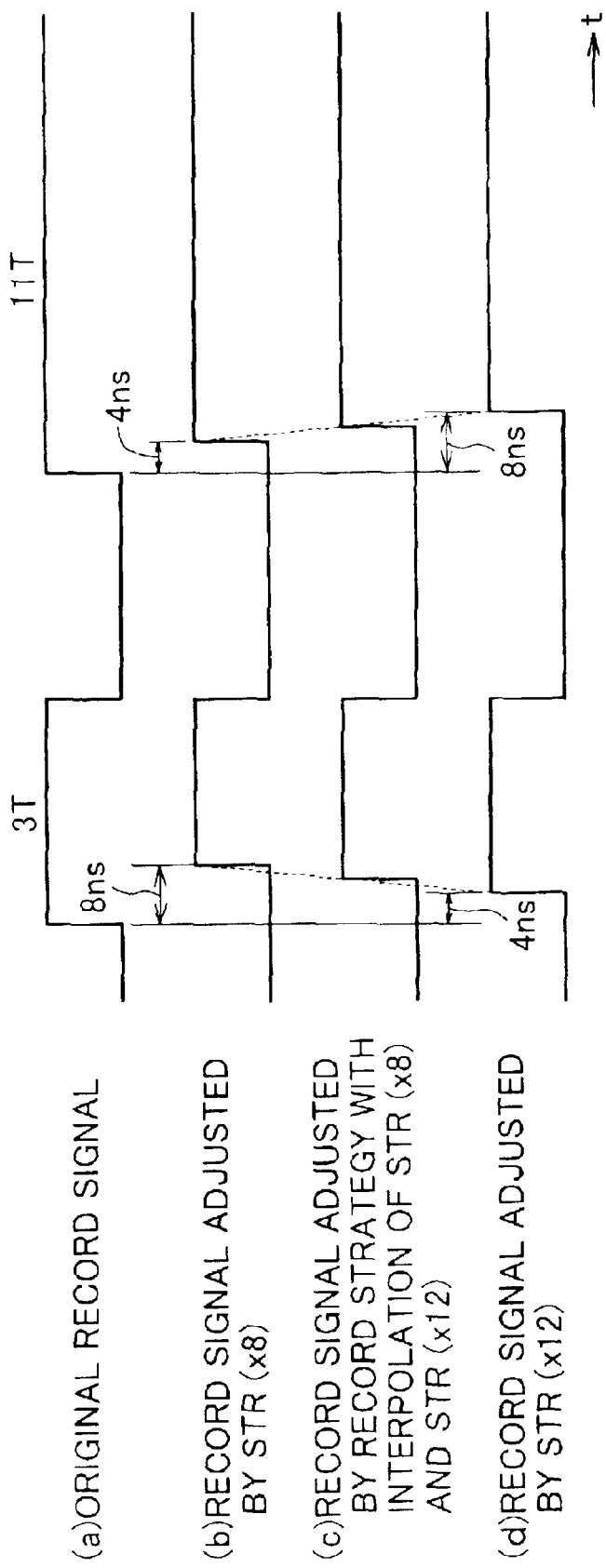

OPTICAL DISK RECORDING METHOD

CROSS REFERENCE TO RELATED APPLICATION

This application is based on Japanese Patent Application No. 2001-248645, filed on Aug. 20, 2001, the entire contents of which are incorporated herein by reference.

BACKGROUND OF THE INVENTION

A) Field of the Invention

The present invention relates to an optical disk recording method of recording data in an optical disk by preparing, for each of a plurality of disk types, data of a waveform adjustment amount to be added to a record signal in accordance with the length of the record signal. Even when data is written in an optical disk for which the waveform adjustment amount of a record signal is not prepared, even when data is written in an optical disk which cannot obtain a good record quality by using a prepared waveform adjustment amount, or even when data is written at a constant angular velocity (CAV), the waveform adjustment amount capable of obtaining a good record quality can be easily set.

B) Description of the Related Art

There are many recordable or rewritable optical disks: recordable or rewritable type CD's such as CD-R and CD-RW and recordable or rewritable type DVD's such as DVD-R, DVD+RW, DVD-RAM and DVD–RW. Even if a laser beam is driven by the same record signal, record film sensitivity and heat conduction of each optical disk become different depending upon a disk type (not a format but a record film material, a maker, a product type number, and the like under the same format). Therefore, the front and back positions of each pit and land change with the disk type and the characteristics of reproduced signals such as jitter (shift in a time axis direction) and deviation (from a normal signal length) become different. It is, therefore, necessary to adjust the time axis and the like of a record signal waveform in accordance with each disk type in order to always ensure an optimum record quality.

Conventionally, data (so-called record strategy) of a waveform adjustment amount for each disk type supplied by a maker is stored in a memory of an optical disk recorder. The waveform adjustment amount to be added to a record signal waveform includes a time axis adjustment amount, the amplitude and width of a pulse partially added to the record signal waveform, and the like. Before actual data is recorded in an optical disk, the disk type is judged and the corresponding record strategy data is read from the memory. The waveform adjustment such as a time axis adjustment of a test signal is performed by using the read record strategy. The adjusted test signal is recorded in a predetermined test record area of the optical disk at different record powers (laser powers) of a laser beam. After test recording, the test signals are reproduced to measure the signal qualities at respective record powers. The record power capable of obtaining the best reproduced signal quality is selected. Thereafter, actual record signals are recorded by setting the laser record power to the selected record power and using the read record strategy.

Newly sold disks or unknown maker disks have no record strategy stored in the memory so that the proper record strategy cannot be determined. In order to record data in such a disk, a user is forced to perform test record to determine a record strategy. In this case, high speed and bulk hardware of high cost is necessary for an optical disk recorder. In addition, an algorithm of forming a record strategy is complicated and it takes a fairly long time to form the strategy.

Even an optical disk having the record strategy stored in the memory does not provide a high record quality because of manufacture variation or if minor change or the like in the optical disk is made without notice.

In CAV recording, the record velocity changes. It is therefore difficult to set a record strategy capable of obtaining a good reproduced signal quality at each record velocity.

SUMMARY OF THE INVENTION

An object of this invention is to provide an optical disk recording method facilitating to set a waveform adjustment amount capable of obtaining a good record quality, even when data is written in an optical disk for which the waveform adjustment amount of a record signal is not prepared, even when data is written in an optical disk which cannot obtain a good record quality by using a prepared waveform adjustment amount, or even when data is written at a constant angular velocity (CAV).

The optical disk recording method is applicable to an optical disk recorder of the type that prepares, for each of a plurality of disk types, data of a waveform adjustment amount to be added to a record signal in accordance with the length of the record signal, selects the waveform adjustment amount corresponding to a disk type, adjusts a record signal by using the selected waveform adjustment amount, and thereafter records data in the optical disk.

According to one aspect of the present invention, there is provided an optical disk recording method of recording data in an optical disk by preparing, for each of a plurality of disk types, data of a waveform adjustment amount to be added to a record signal in accordance with the length of the record signal, the method comprising the steps of: performing test recording for an optical disk whose data of the waveform adjustment amount is not prepared, by using the waveform adjustment amounts for all the disk types or a plurality of properly adopted disk types and by changing a record power; reproducing test signals recorded by the test recording; judging the qualities of the reproduced test signals; selecting the waveform adjustment amount providing a relatively high signal quality; adjusting the record signal by the selected adjustment amount; and recording the adjusted record signal in the optical disk.

For the optical disk without a prepared waveform adjustment amount, the waveform is adjusted by selecting the waveform adjustment amount providing a relatively high signal quality from the prepared waveform adjustment amounts. As compared to forming the waveform adjustment amount, i.e., record strategy from scratch, it is easier to set the waveform adjustment amount. In this case, the test recording and judging the signal quality are performed: first by using typical waveform adjustment amounts for respective record material series (e.g., dye series); next by using prepared waveform adjustment amounts prepared for the disk types belonging to the record material series providing a relatively high signal quality as judged from the results of the first test recording; selecting the waveform adjustment amount providing a relatively high signal quality as judged from the results of the second test recording; adjusting the record signal by the selected waveform adjustment amount; and recording the adjusted record signal in the optical disk. Since all the prepared waveform adjustment amounts are not necessary to be used for the test recording, the time taken to select the waveform adjustment amount can be shortened. An area of the optical disk used by the test recording can be made small. The record power providing a good signal quality at the selected waveform adjustment amount is selected in accordance with the second test recording, and the adjusted record signal is recorded at this record power.

According to another aspect of the present invention, there is provided an optical disk recording method of recording data in an optical disk by preparing, for each of a plurality of disk types, data of a waveform adjustment amount to be added to a record signal in accordance with the length of the record signal, the method comprising the steps of: performing first test recording for an optical disk whose data of the waveform adjustment amount is prepared, by using the prepared waveform adjustment amount and by changing a record power; reproducing test signals recorded by the first test recording; if a record power providing a predetermined signal quality exists, adjusting the record signal by the waveform adjustment amount providing the predetermined signal quality and recording the adjusted record signal in the optical disk; if a record power providing the predetermined signal quality does not exist, performing second test recording by using the prepared waveform adjustment amounts and by changing the record power; reproducing test signals recorded by the second test recording; judging the signal quality of the reproduced test signals; selecting the waveform adjustment amount providing a relatively high signal quality; adjusting the record signal by the selected waveform adjustment amount; and recording the adjusted record signal in the optical disk.

For the optical disk which cannot provide a good record quality if the prepared waveform adjustment amount is used for the record signal, the waveform is adjusted by selecting the waveform adjustment amount providing a relatively high signal quality from the prepared waveform adjustment amounts of other disk types. As compared to forming the waveform adjustment amount, i.e., record strategy from scratch, it is easier to set the waveform adjustment amount. In this case, if the record power providing the predetermined signal quality does not exists, the second test recording is performed by using the prepared waveform adjustment amounts of the disk types belonging to the same record material series as that of the subject optical disk. Since the number of steps of changing the record power to be used at each waveform adjustment amount during the second test recording can be reduced, it is possible to shorten the time taken to select the waveform adjustment amount. An area of the optical disk used by the test recording can be made small. If the record power providing the predetermined signal quality does not exist after the first test recording, the second test recording is performed at the record power in the limited range of the record powers providing the relatively good signal quality as judged from the first test recording. The waveform adjustment amount providing the relatively high signal quality is selected from the results of the second test recording. The record signal is adjusted by the selected waveform adjustment amount and recorded in the optical disk. Since the number of steps of changing the record power to be used at each waveform adjustment amount during the second test recording can be reduced, it is possible to shorten the time taken to select the waveform adjustment amount. An area of the optical disk used by the test recording can be made small. In this case, the retest recording is performed to obtain an optimum record power by using the waveform adjustment amount selected by the second test recording and by changing the record power in the range wider than that of the second test recording. If it is judged from the first test recording that the record power providing a predetermined signal quality exists, the record power providing a good signal quality is selected from the results of the first test recording and the record signal is recorded at this record power. If it is judged from the first test recording that the record power providing a predetermined signal quality does not exist, the record power providing the good signal quality at the selected waveform adjustment amount is selected from the results of the second test recording and the record signal is recorded at this record power.

According to a further aspect of the present invention, there is provided an optical disk recording method of recording data in an optical disk by preparing, for each of a plurality of disk types, data of a waveform adjustment amount to be added to a record signal in accordance with the length of the record signal, the method comprising the steps of: in CAV-recording an optical disk with prepared data of the waveform adjustment amount and an optical disk without prepared data of the waveform adjustment amount, performing test recording by using the waveform adjustment amounts for all the disk types or a plurality of properly adopted disk types and by changing a record power at each of a plurality of record velocities; reproducing test signals recorded by the test recording; judging the qualities of the reproduced test signals; selecting the waveform adjustment amount providing a relatively high average of signal qualities at respective record velocities; adjusting the record signal by the selected adjustment amount; and CAV-recording the adjusted record signal in the optical disk.

The record signal is CAV-recorded in the optical disk by selecting the waveform adjustment amount providing a relatively high average of signal qualities at each of the record velocities. Accordingly, even if the record velocity gradually changes in CAV-recording, the data record with a high signal quality is possible. The record velocity for the test recording may use a plurality of velocities in the range of record velocities changing in the actual CAV-recording.

According to a still further aspect of the present invention, there is provided an optical disk recording method of recording data in an optical disk by preparing, for each of a plurality of disk types, data of a waveform adjustment amount to be added to a record signal in accordance with the length of the record signal, the method comprising the steps of: in CAV-recording an optical disk with prepared data of the waveform adjustment amount and an optical disk without prepared data of the waveform adjustment amount, performing test recording by using the waveform adjustment amounts for all the disk types or a plurality of properly adopted disk types and by changing a record power at each of a plurality of record velocities; reproducing test signals recorded by the test recording; judging the qualities of the reproduced test signals; selecting the waveform adjustment amount providing a relatively high signal quality at each of the record velocities; adjusting the record signal at each record velocity by the adjustment amount obtained through interpolation of a plurality of selected waveform adjustment amounts; and CAV-recording the adjusted record signal in the optical disk.

The record signal is CAV-recorded in the optical disk by adjusting the record signal at each record velocity by the adjustment amount obtained through interpolation of a plurality of selected waveform adjustment amounts. Accordingly, even if the record velocity gradually changes in CAV-recording, the data record with a high signal quality is possible. The record velocity for the test recording may use a plurality of velocities in the range of record velocities changing in the actual CAV-recording or outside of this range. The record velocity (linear velocity) can be obtained from the revolution rate of CAV and a disk radial position. The disk radial position can be detected from ATIP information or with a position detector (linear scale or the like).

Judging the signal quality of the reproduced test signals may be performed by measuring an area surrounded by an abscissa and an each curve of the characteristics of a C1 error rate relative to an asymmetry value β sliced at a slice level of a certain C1 error rate value, or by measuring an area surrounded by an abscissa and an each curve of the characteristics of a jitter value relative to an asymmetry value β sliced at a slice level of a certain jitter value, and by judging that the signal quality is relatively higher as the area is larger.

The selected waveform adjustment amount together with identification information of the optical disk may be stored in a memory, and if an optical disk used thereafter has the same identification information, the test recording is performed by using the waveform adjustment amount stored in the memory.

BRIEF DESCRIPTION OF THE DRAWINGS

FIG. 12 is a waveform diagram illustrating how the record strategy is changed in accordance with a record velocity gradually changing during CAV recording.

DESCRIPTION OF THE PREFERRED EMBODIMENTS

Figure 1:
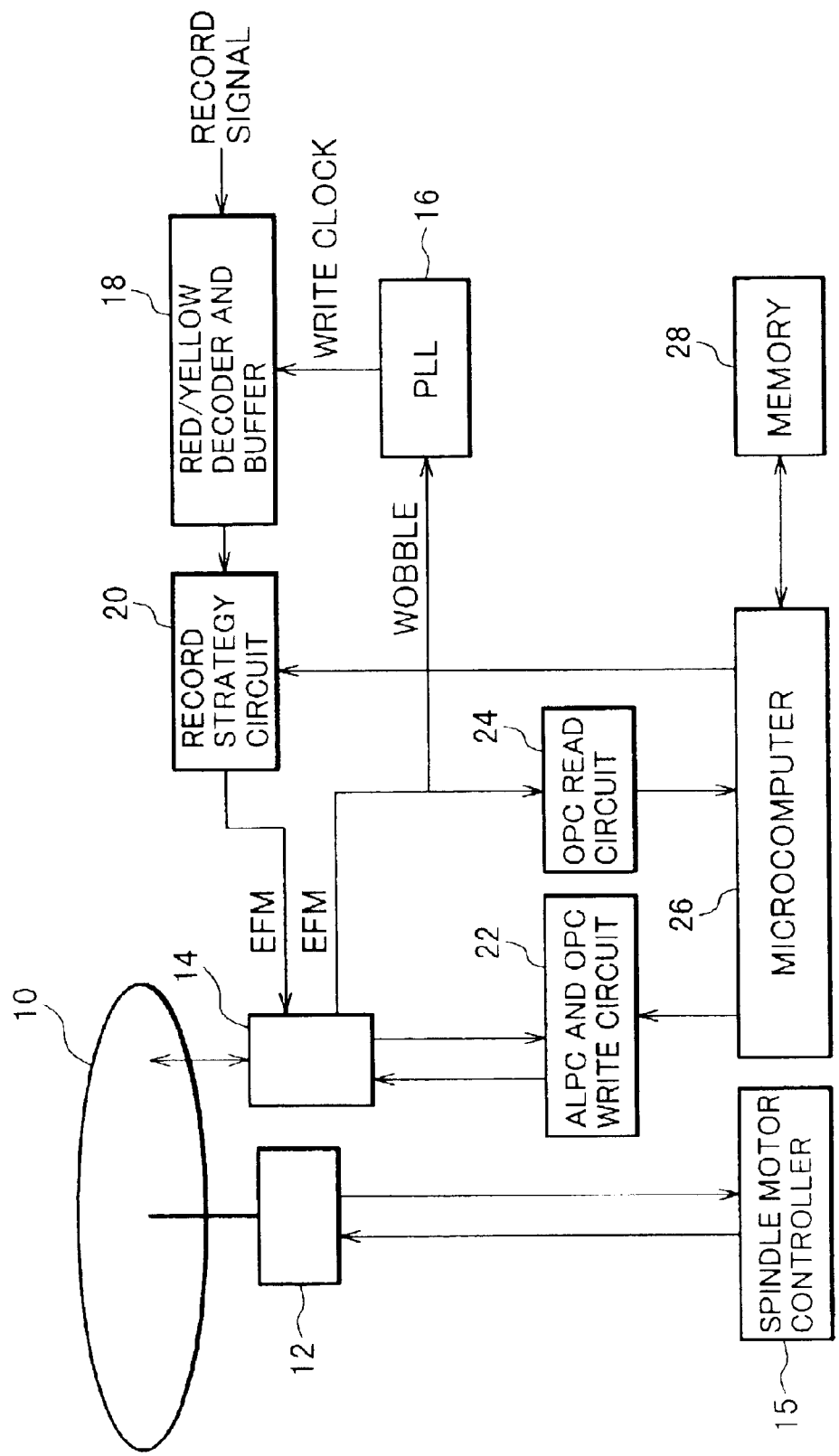
FIG. 1 is a block diagram showing the outline structure of an optical disk recorder using an optical disk recording method of this invention.

FIG. 1 is a diagram showing the outline structure of a CD-R/RW drive (an optical disk recording/reproducing apparatus capable of recording/reproducing a CD-R disk and a CD-RW disk) to which the optical disk recording method of the invention is applied.

In this optical disk recording/reproducing apparatus, data (record strategy) of a waveform adjustment amount to be added to a record signal in accordance with the signal length (pit length, land length) for each of a plurality of disk types is prepared and stored in a memory, the waveform adjustment amount corresponding to a disk type is selected, and the record signal is adjusted by the selected waveform adjustment amount to write actual data in an optical disk. An optical disk 10 (CD-R disk or CD-RW disk) is driven by a spindle motor 13, and an optical pickup 14 reads/writes data from/into the optical disk. A spindle motor controller 15 controls the spindle motor 12 to perform constant linear velocity (CLV) control or CAV control. Namely, during data write under CLV control, the spindle motor 12 is controlled so that a wobble signal obtained in a tracking error signal output from the optical pickup 14 is detected at a predetermined frequency (22.05 kHz at 1× velocity). During data write under CAV control (in a CAV record mode for a CLV disk), the spindle motor 12 is controlled so that an FG pulse output from the spindle motor 12 is detected at a predetermined frequency.

A PLL circuit 16 generates a write clock synchronous with the wobble signal. A red/yellow decoder and buffer 18 EFM-modulates a record signal in a manner in conformity with the Red Book Standard and Yellow Book Standard. A record strategy circuit 20 adjusts the time axis of an EFM signal. The EFM signal with the adjusted time axis drives a laser source in the optical pickup 14 to write the EFM signal in the optical disk 10.

An ALPC and OPC write circuit 22 performs a so-called automatic laser power control (ALPC) to maintain the power of a laser beam at a predetermined value and a so-called optimum power control (OPC) to sequentially change a test record power by a predetermined step and find an optimum record power. ALPC controls the laser power detected with a front monitor in the optical pickup 14 to have a predetermined power. For OPC write (test record), a test record signal is EFM-modulated by the red/yellow decoder and buffer 18, the time axis of the test record signal is adjusted by the record strategy circuit 20, and the laser power is sequentially changed a predetermined number of steps by a predetermined step (refer to FIG. 3) to write the test record signal in an OPC area of the innermost circumference of the optical disk 10.

For OPC read, an OPC read circuit 24 reads a signal reproduced from the test record data and measures signal quality parameters at each laser power step. The signal quality parameters include: a C1 error (Reed-Solomon correction level 1 error) rate; a CU error (error unable to be corrected) rate; a PLL clock reproduction asynchronous rate); a jitter value and the like. A microcomputer 26 judges the disk type (such as a maker and a product type number) from a disk ID (disk identification information) when the optical disk 10 is loaded in the apparatus. The microcomputer 26 controls OPC read to determine an optimum record strategy and an optimum record power from the measurement results by the OPC read circuit 24. The microcomputer 26 sets the optimum record strategy to the record strategy circuit 20, and sets the optimum record power to the ALPC and OPC write circuit 22 as an initial target record power of actual data recording. Upon reception of an actual data write command, the actual data writing starts. After the start of the actual data writing, the target record power under ALPC is changed through so-called real time OPC (ROPC) so as to maintain a predetermined record state. A memory 28 such as a flash memory stores a record strategy to be applied to each product (product type number or the like) of each disk maker. The record strategy includes the waveform adjustment amounts such as a time axis adjustment amount, the amplitude and width of a pulse to be added partially to the waveform of a record signal.

Figure 2:
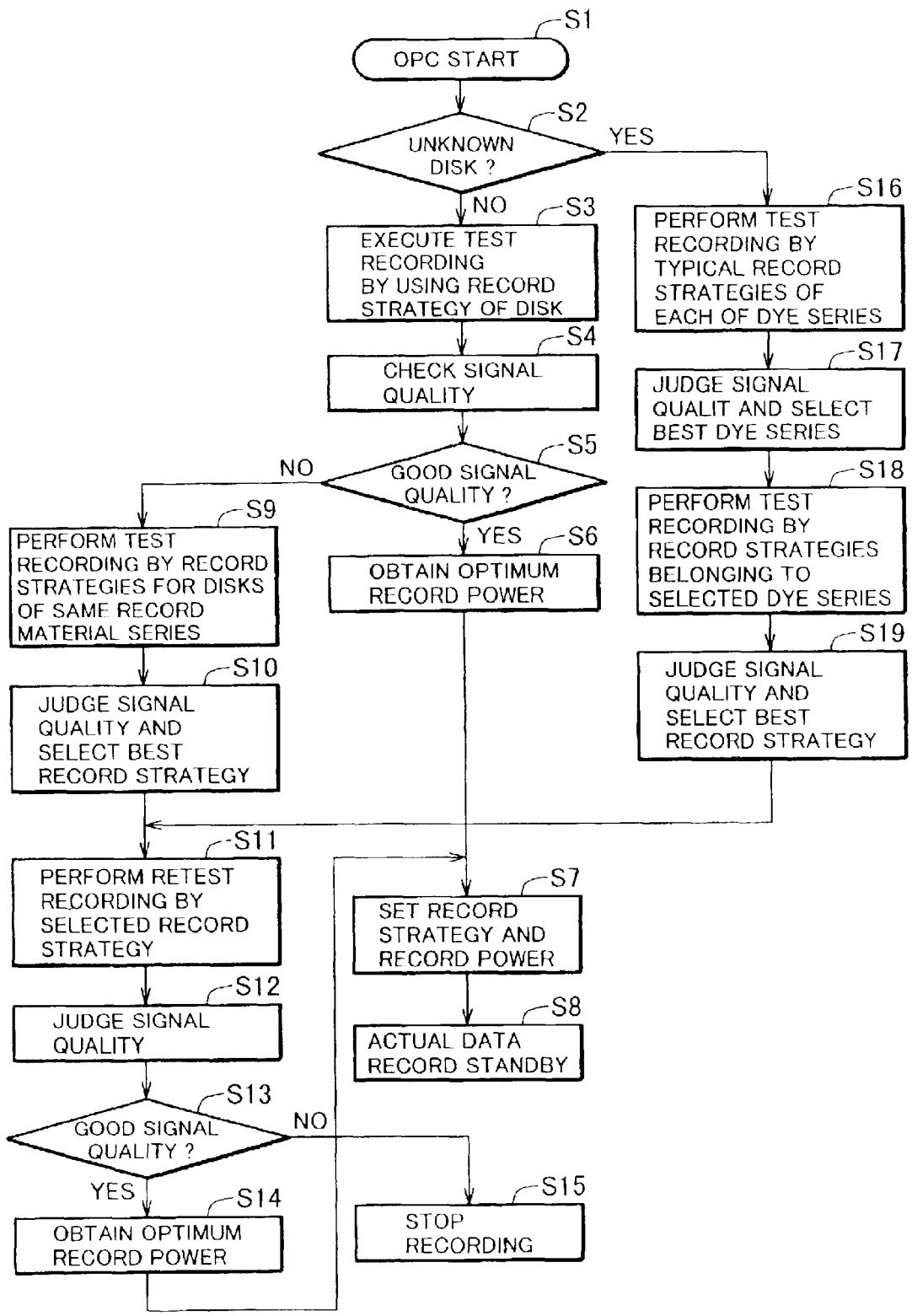
FIG. 2 is a flow chart illustrating the operation of setting a record strategy and a record power to an optical disk recorder shown in FIG. 1.

A procedure of setting the record strategy and record power under the control of the microcomputer 26 will be described with reference to the flow chart shown in FIG. 2. When the optical disk 10 is loaded in the apparatus, OPC starts (Step S1). First, the disk ID (identification information of the disk type such as maker and product type number) is read, the disk ID being contained in ATIP special information recorded in the pregroove in the lead-in area of the optical disk 10. It is then checked whether the optical disk has the record strategy stored in the memory 28 or not (unknown disk) (Step S2). In accordance with this check result, the following control is executed thereafter.

Figure 3:
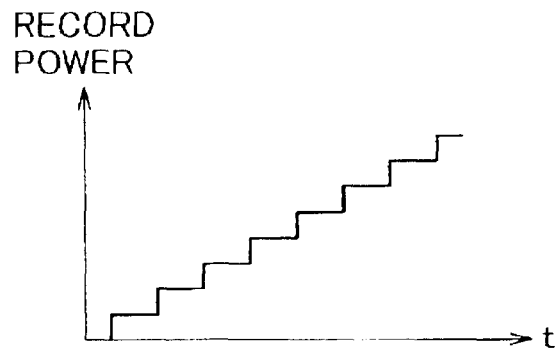
FIG. 3 is a graph showing a change in a record power during optimum power control (OPC).
Figure 4:
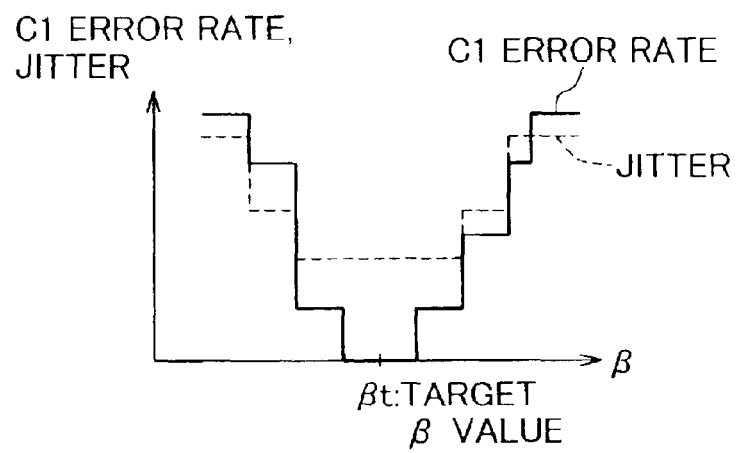
FIG. 4 is a graph showing the characteristics of a C1 error rate and a jitter value relative to an asymmetry value β obtained through OPC.
Figure 5:
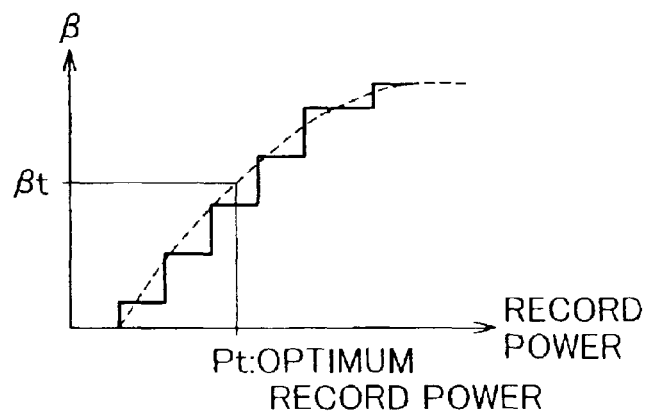
FIG. 5 is a graph showing the characteristics of the asymmetry value β relative to a record power obtained through OPC.
Figure 6:
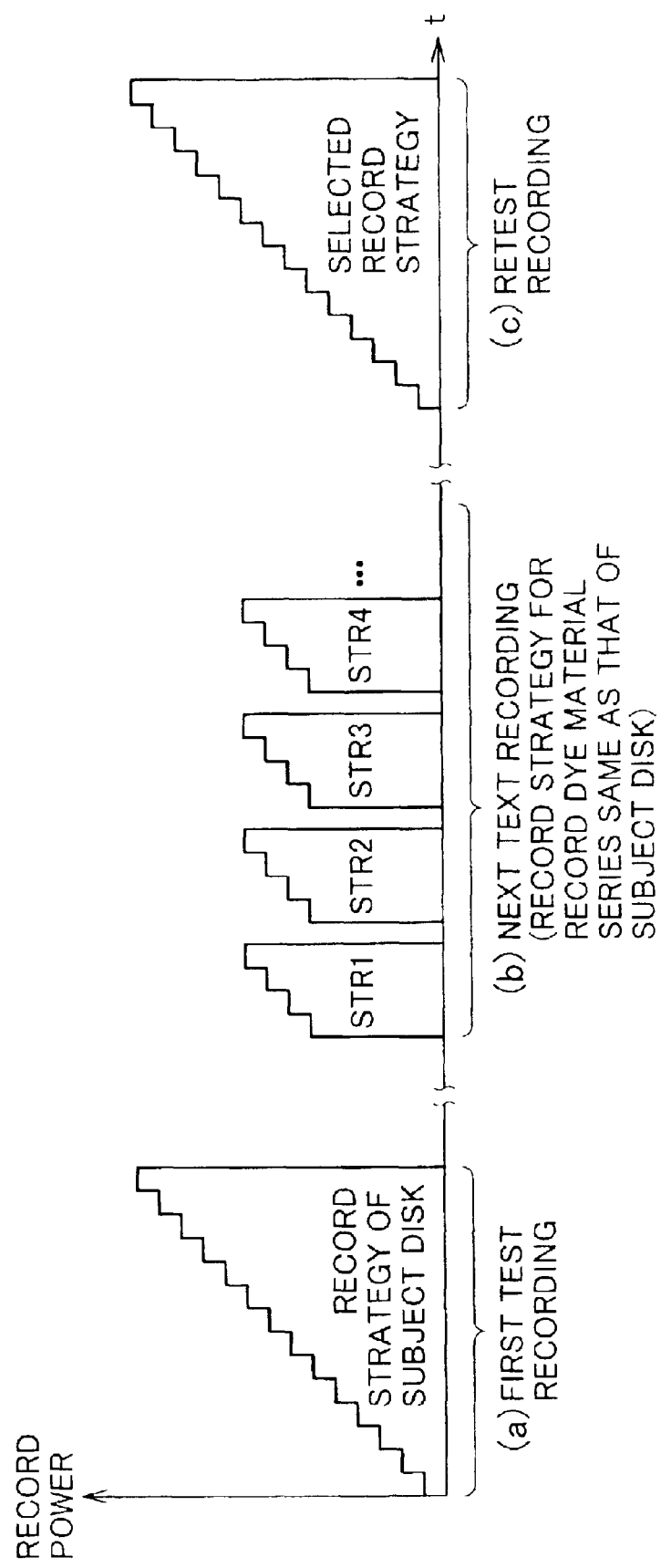
FIG. 6 is a graph showing a change in the record power during OPC.

(1) Disk having the record strategy stored in the memory:

The record strategy is read from the memory 28 and set to the record strategy circuit 20. The ALPC and OPC write circuit 22 performs test recording by changing stepwise the record power as shown in FIG. 3 (Step S3). After test recording, the OPC read circuit 24 reproduces the recorded test signal and checks the quality of the reproduced signal (Step S4, S5). In checking the signal quality, for example, a C1 error rate or a jitter value is used. More specifically, as shown in FIG. 4 the characteristics (solid line) of a C1 error rate relative to an asymmetry value $\beta$ and the characteristics (broken line) of the jitter value relative to the asymmetry value $\beta$ are measured. The asymmetry value $\beta$ is a parameter representative of a positive/negative level ratio of a reproduced RF signal and changes with the record power, i.e., a recorded pit depth. It is then checked whether there is the asymmetry value $\beta$ (record power value) at which the C1 error rate is smaller than a predetermined value and the jitter value is smaller than a predetermined value. If such an asymmetry value $\beta$ exists, the signal quality is judged good, whereas if not, the signal quality is judged bad. The signal quality may be judged only from the characteristics of the C1 error rate relative to the asymmetry value $\beta$ or only from the characteristics of the jitter value relative to the asymmetry value $\beta$. The signal quality may be judged from the CU error rate, PLL clock reproduction asynchronous rate or the like.

i) If the signal quality is judged good:

If the signal quality is judged good, the asymmetry value $\beta$ providing the best signal quality judged from the measurement results of test recording is used as a target asymmetry value $\beta t$ (refer to FIG. 4). For example, such an asymmetry value $\beta$ is: a median of the asymmetry values $\beta$ in the range providing the lowest C1 error rate, a median of the asymmetry values $\beta$ in the range providing the lowest jitter value; a median of the asymmetry values $\beta$ in the range providing the lowest C1 error rate and lowest jitter value; a barycenter in the asymmetry value $\beta$ direction of the characteristics of the C1 error rate relative to the asymmetry value $\beta$; a barycenter in the asymmetry value $\beta$ direction of the characteristics of the jitter value relative to the asymmetry value $\beta$; or the like. As shown in FIG. 5, the characteristics (solid line) of the asymmetry value $\beta$ relative to the record power are obtained from the measurement results of the test recording. The characteristics are approximated through least square or the like to obtain a linear or secondary approximate expression (broken line). A record power value Pt realizing the target asymmetry value $\beta t$ is obtained from the approximate expression as an optimum record power (Step S6). This optimum record power value Pt is set to the ALPC and OPC write circuit 22 as a target ALPC value, and the record strategy of the disk is set to the record strategy circuit 20 (Step S7). An actual data record standby state enters (Step S8), and the actual data record starts in response to an actual data record start command from the user. After the start of the actual data recording, the target ALPC value is changed under ROPC to maintain the target asymmetry value $\beta t$, because the record power value Pt realizing the target asymmetry value $\beta t$ changes with a change in the record film thickness at each position in the disc radial direction.

ii) If the signal quality is judged bad:

If the signal quality is judged bad, the record strategies prepared and stored in the memory 28 for optical disks other than the subject optical disk 10 having the same dye series of the record material as the subject optical disk 10 are sequentially set to the record strategy circuit 20 to perform test recording (Step S9). In the case of CD-R disks, the dye series includes cyanine dye series, phthalocyanine dye series, supercyanine dye series, and the like. If the number of record strategies is large and test recording is performed for each record strategy in the wide range of record powers similar to the first test recording (Step S3), a large area of the optical disk 10 is used for test recording and it takes a long time to perform test recording. To avoid this, as shown in FIG. 6, a record power providing a relatively good signal quality is judged from the first test recording (indicated at (a) in FIG. 6). By changing the record power in the limited range around the judged record power (i.e., at the limited number of steps), next test recording (indicated at (b) in FIG. 6) is performed for all the record strategies STR1, STR2, STR3, . . . of disks having the same record material series. After the completion of the test recording for the record strategies STR1, STR2, STR3, . . . , the test signals are reproduced and the record strategy providing the best signal quality is selected (Step S10).

Figure 7A:
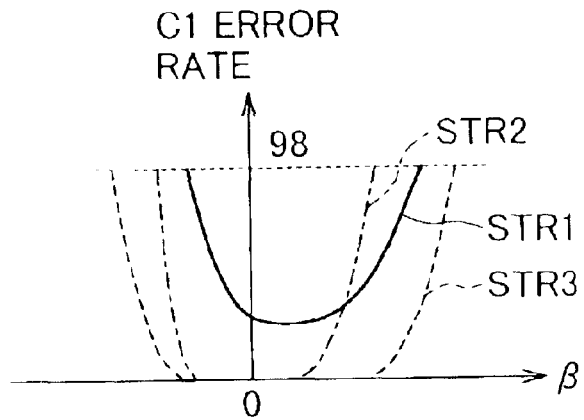
FIGS. 7A, 7B and 7C are graphs illustrating how the best record strategy is selected from the characteristics of the C1 error rate relative to the asymmetry value β obtained through OPC.
Figure 7B:
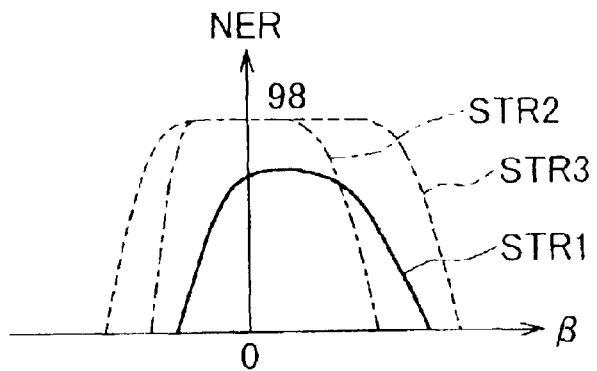
Figure 7C:
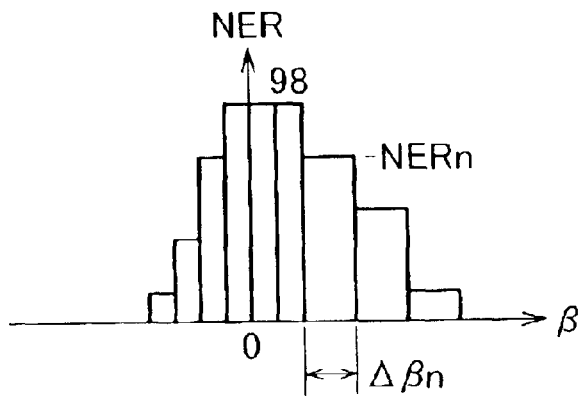

One method of selecting the best record strategy from the record strategies STR1, STR2, STR3, . . . will be described. It is assumed that the graph of FIG. 7A shows the characteristics of the C1 error rate relative to the asymmetry value $\beta$ measured from the reproduced signals of the test recording by the record strategies STR1, STR2, STR3, . . . By slicing this graph by a certain C1 error rate and inverting the graph, the characteristics shown in FIG. 7B are obtained. In the case of the CD format, for example, assuming that the C1 error rate is the number of C1 errors measured in one sub-code frame, the maximum C1 error rate is 98. If the slice value is set to 98, the ordinate of the inverted characteristics represents the number of C1 non-errors NER. An area surrounded by the abscissa and the curve of the characteristics of the number of C1 non-errors NER relative to the asymmetry value $\beta$ becomes larger as the signal quality becomes better. An area surrounded by the abscissa and each curve of the characteristics obtained by each of the record strategies STR1, STR2, STR3, . . . is calculated. The record strategy providing the largest area (in the example shown in FIG. 7B, the record strategy STR3) is selected as the best record strategy. In an actual case, since the record power is changed stepwise to perform test recording, the characteristics of the C1 non-errors NER relative to the asymmetry value $\beta$ are stepwise as shown in FIG. 7C. In this case, an area SQ at each record power can be obtained from a total sum of the C1 non-errors NERn at the record power multiplied by a difference $\Delta\beta n$ between the asymmetry value at the record power and that at the next step record power, as expressed:

$$SQ = \sum_n (\Delta\beta n * NERn)$$

The record strategy providing the largest SQ value is selected as the best record strategy.

Figure 8A:
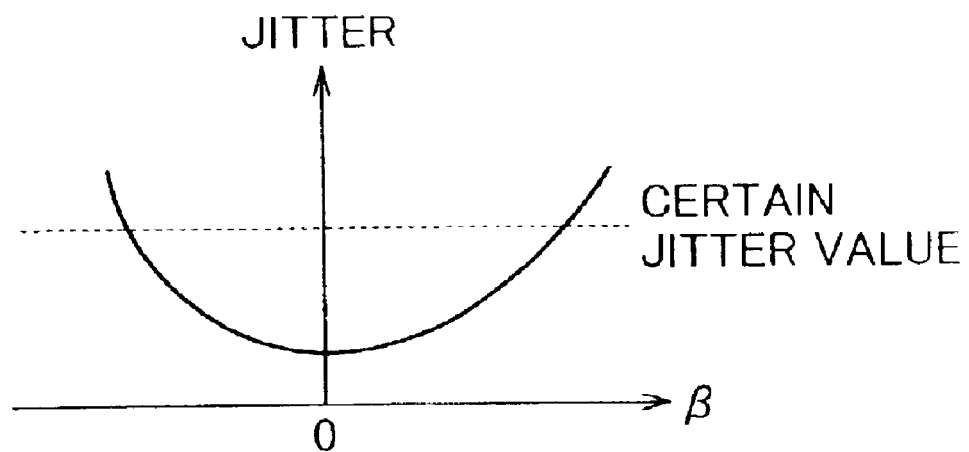
FIGS. 8A and 8B are graphs illustrating how the best record strategy is selected from the characteristics of the jitter value relative to the asymmetry value β obtained through OPC.
Figure 8B:
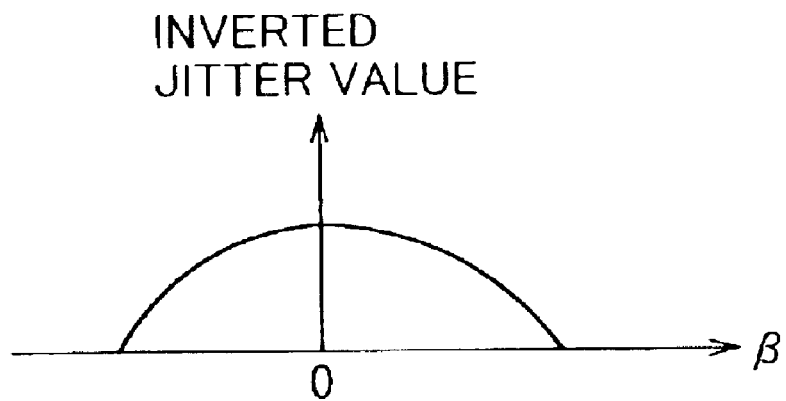

If the jitter value is used, the best record strategy can be selected in a similar manner. It is assumed that the graph of FIG. 8A shows the characteristics of the jitter value relative to the asymmetry value β measured from the reproduced signals of test recording by one record strategy. By slicing the graph by a certain slice value and inverting the graph, the characteristics shown in FIG. 8B are obtained. An area surrounded by the abscissa and the curve of the characteristics of the inverted jitter value relative to the asymmetry value β becomes larger as the signal quality becomes better. An area surrounded by the abscissa and each curve of the characteristics obtained by each record strategy is calculated. The record strategy providing the largest area is selected as the best record strategy.

After the best record strategy is selected, as indicated at (c) in FIG. 6 the retest recording is performed by changing the record power in the wide range same as that of the first test recording (indicated at (a) in FIG. 6) by using the selected best record strategy (Step S11). After the retest recording, test signals are reproduced to judge the signal quality (Step S12, S13). If the signal quality is judged good, the asymmetry value β providing the best signal quality as judged from the measurement results of the reproduced signal characteristics of the retest recording is used as the target asymmetry value βt as shown in FIG. 4. As shown in FIG. 5, the characteristics (solid line) of the asymmetry value β relative to the record power are obtained from the measurement results of the reproduced signal characteristics of the retest recording. The characteristics are approximated through least square or the like to obtain a linear or secondary approximate expression (broken line). A record power value Pt realizing the target asymmetry value βt is obtained from the approximate expression as an optimum record power (Step S14). This optimum record power value Pt is set to the ALPC and OPC write circuit 22 as a target ALPC value, and the selected record strategy is set to the record strategy circuit 20 (Step S7). An actual data record standby state enters (Step S8), and the actual data recording starts in response to an actual data record start command from the user. The selected record strategy along with the disk ID is stored in the memory 28. When the corresponding disk ID is thereafter read, the stored record strategy is read to perform OPC test recording. If the results of the retest recording (indicated at (c) in FIG. 6) indicate that the good signal quality cannot be obtained at the selected record strategy (e.g., if the asymmetry value β does not exist which provides the C1 error rate equal to or smaller than a predetermined value and the jitter value equal to or smaller than a predetermined value), then the recording is stopped (Step S15).

Figure 9:
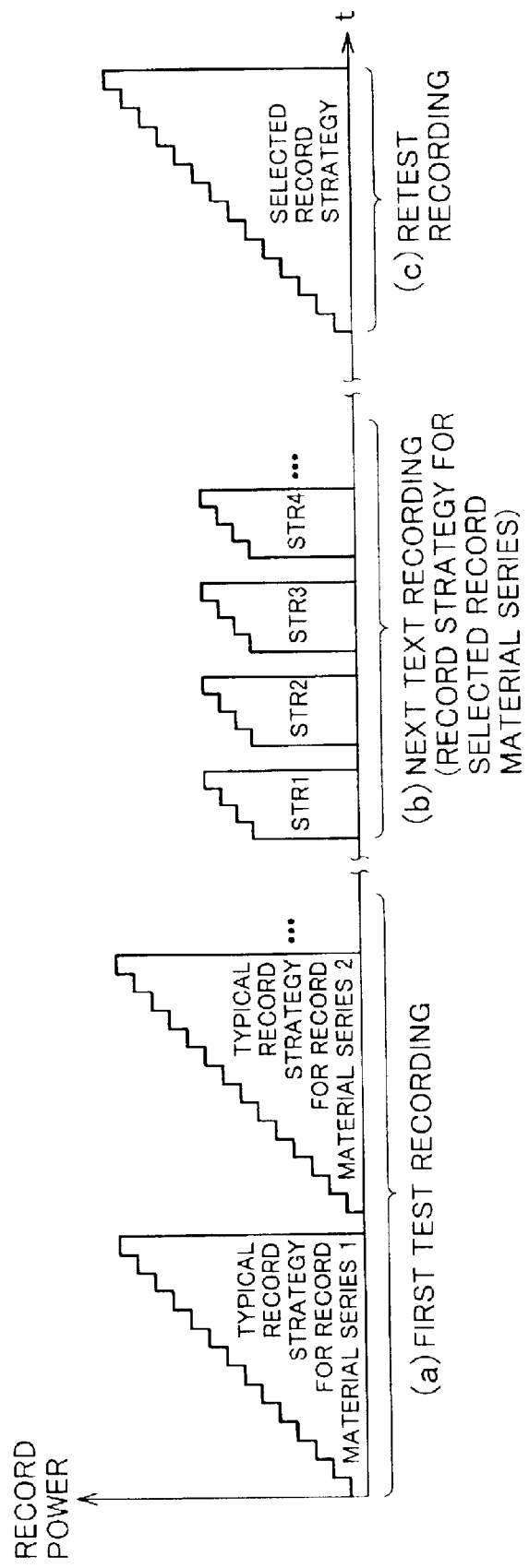
FIGS. 9 to 11 are graphs showing a change in the record power during OPC.

(2) Disk not having the record strategy stored in the memory:

By using typical record strategies prepared and stored in the memory 28 for optical disks of respective record material series (dye material series such as cyanine dye series, phthalocyanine dye series and supercyanine dye series in the case of CD-R disk), test recording are sequentially performed by changing stepwise the record power as indicated at (a) in FIG. 9 (Step S16). After the test recording, the test signal is reproduced and the record material series providing the best signal quality is selected (Step S17). After the record material series is selected, next test recording is sequentially performed by using all record strategies prepared and stored in the memory 28 for the disks having the selected record material series (Step S18). In this case, if the number of record strategies is large and test recording is performed for each record strategy in the wide range of record powers similar to the first test recording (Step S16), a large area of the optical disk 10 is used for test recording and it takes a long time to perform test recording. To avoid this, as shown in FIG. 9, a record power providing a relatively good signal quality is judged from the first test recording (indicated at (a) in FIG. 9). By changing the record power in the limited range around the judged record power (i.e., at the limited number of steps), next test recording (indicated at (b) in FIG. 9) is performed for all the record strategies STR1, STR2, STR3, . . . of disks having the same record material series. After the completion of the next test recording (indicated at (b) in FIG. 9) for the record strategies STR1, STR2, STR3, . . . , the test signals are reproduced and the record strategy providing the best signal quality is selected (Step S19).

After the best record strategy is selected, as indicated at (c) in FIG. 9 the retest recording is performed by changing the record power in the wide range same as that of the first test recording (indicated at (a) in FIG. 9) by using the selected best record strategy (Step S11). After the retest recording, test signals are reproduced to judge the signal quality (Step S12, S13). If the signal quality is judged good, the asymmetry value β providing the best signal quality as judged from the measurement results of the reproduced signal characteristics of the retest recording is used as the target asymmetry value βt as shown in FIG. 4. As shown in FIG. 5, the characteristics (solid line) of the asymmetry value β relative to the record power are obtained from the measurement results of the reproduced signal characteristics of the retest recording. The characteristics are approximated through least square or the like to obtain a linear or secondary approximate expression (broken line). A record power value Pt realizing the target asymmetry value βt is obtained from the approximate expression as an optimum record power (Step S14). This optimum record power value Pt is set to the ALPC and OPC write circuit 22 as a target ALPC value, and the selected record strategy is set to the record strategy circuit 20 (Step S7). An actual data record standby state enters (Step S8), and the actual data recording starts in response to an actual data record start command from the user. The selected record strategy along with the disk ID is stored in the memory 28. When the corresponding disk ID is thereafter read, the stored record strategy is read to perform OPC test recording. If the results of the retest recording (indicated at (c) in FIG. 9) indicate that the good signal quality cannot be obtained at the selected record strategy (e.g., if the asymmetry value β does not exist which provides the C1 error rate equal to or smaller than a predetermined value and the jitter value equal to or smaller than a predetermined value), then the recording is stopped (Step S15).

CAV recording and CAV reproducing are used for high speed recording of and high speed access to CD-R disks and CD-RW disks. In CAV recording, a record velocity (linear velocity) gradually changes (increases). It is therefore preferable to select the record strategy by performing test recording at several record velocities. One method of selecting the record strategy will be described with reference to FIG. 10. It is assumed in FIG. 10 that the optical disk used has its record strategy stored in the memory 28. First, test recording (indicated at (a) in FIG. 10) is performed at a predetermined velocity by changing the record power in a wide range. The test signal is reproduced. If a good signal quality can be obtained, this test strategy is selected and the optimum record power is obtained from the test recording result. Actual data recording is then performed.

Figure 10:
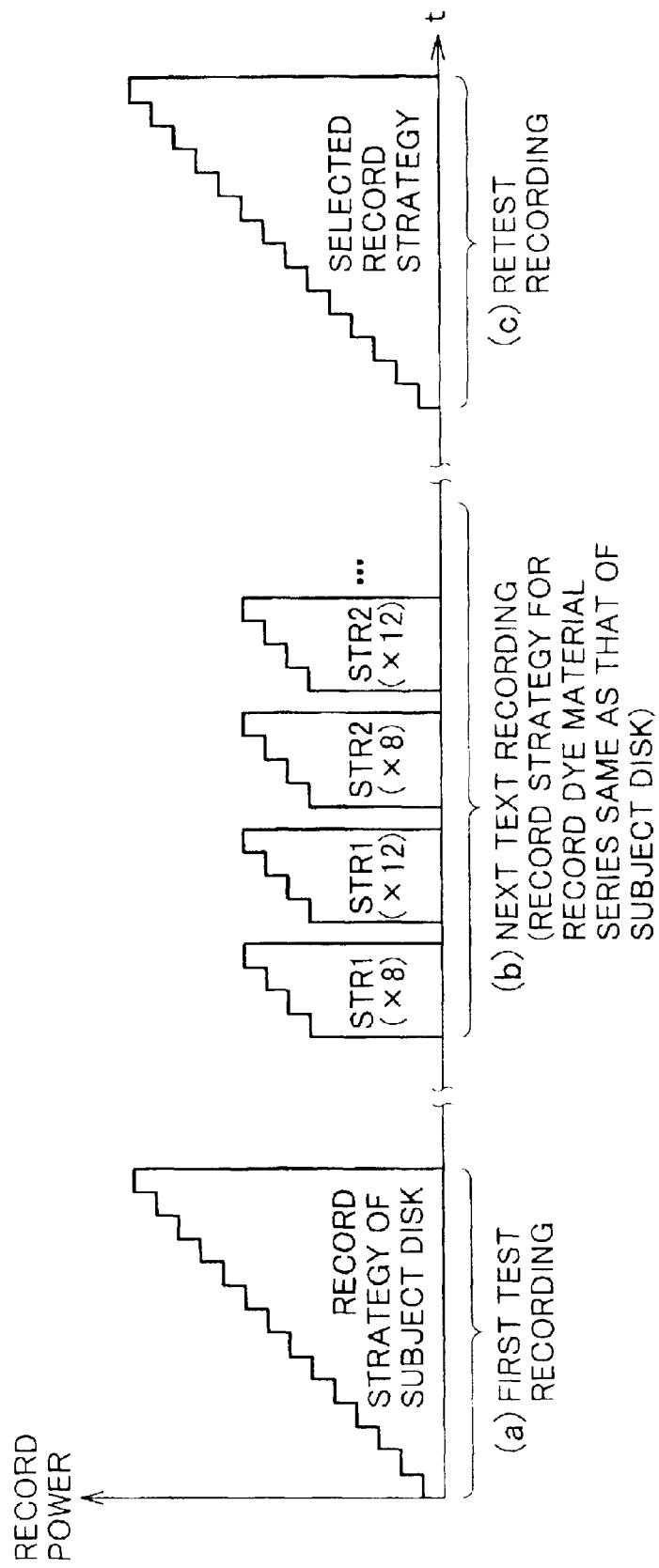

If a good signal quality cannot be obtained, all record strategies STR1, STR2, STR3, . . . prepared and stored in the memory 28 for optical disks other than the subject optical disk 10 having the same record material series as that of the subject optical disk 10 are used to sequentially perform test recording (indicated at (b) in FIG. 10) at a plurality of record velocities (8×, 12×, . . . ). In this case, a record power providing a relatively good signal quality is judged from the first test recording (indicated at (a) in FIG. 10). By changing the record power in the limited range around the judged record power (i.e., at the limited number of steps), next test recording (indicated at (b) in FIG. 10) is performed. After the completion of the test recording (indicated at (b) in FIG. 10), the test signals are reproduced and the record strategy providing the best average of signal qualities at respective record velocities is selected. After the best record strategy is selected, as indicated at (c) in FIG. 10 the retest recording is performed by changing the record power in the wide range same as that of the first test recording (indicated at (a) in FIG. 10) by using the selected best record strategy. After the retest recording, test signals are reproduced to judge the signal quality. If the signal quality is judged good, the best record power is obtained from the measurement results of the test recording (indicated at (c) in FIG. 10) to perform actual data recording. If it is judged that the signal quality is bad, actual data recording by CAV is stopped.

In the above description, if the first test recording (indicated at (a) in FIG. 10) using the record strategy of the subject disk shows a good signal quality, this record strategy is used for recording actual data. Even if the first test recording (indicated at (a) in FIG. 10) using the record strategy of the subject disk shows a good signal quality, the next test recording (indicated at (b) in FIG. 10) may be performed by using all record strategies having the same record material series and including the record strategy of the subject disk, at a plurality of record velocities to select the best record strategy.

Figure 11:
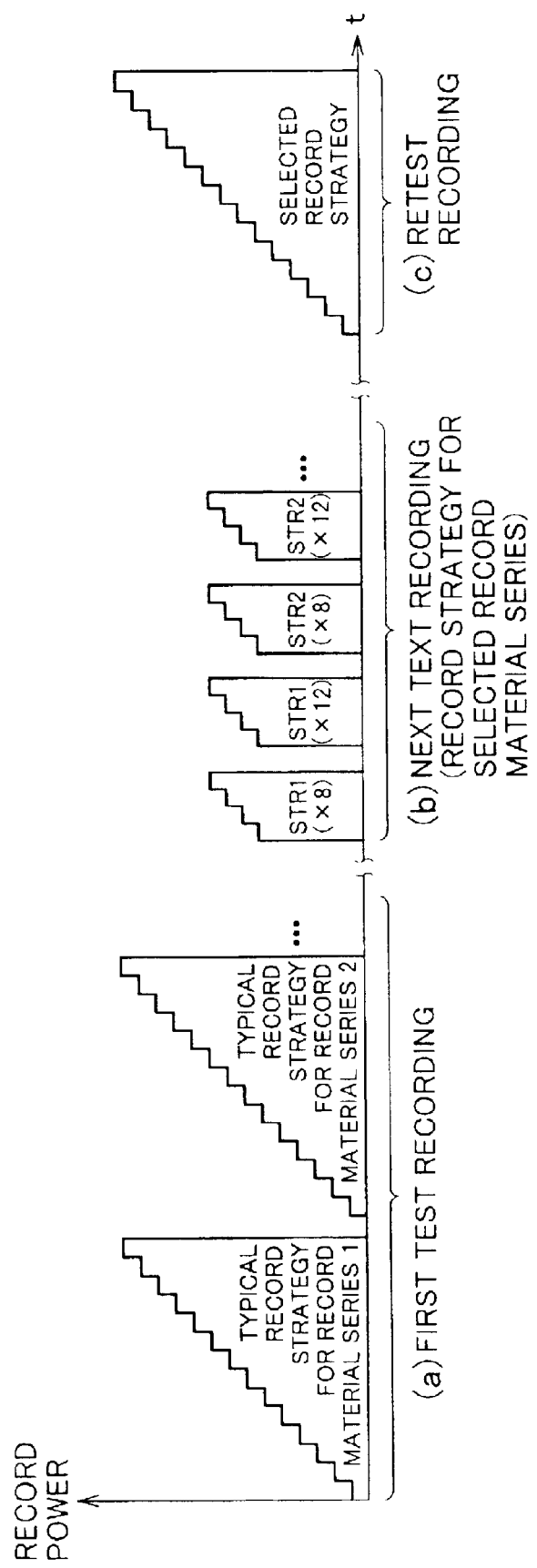

In CAV recording of an optical disk having no record strategy stored in the memory 28, first test recording indicated at (a) in FIG. 11 is sequentially performed by using typical record strategies prepared and stored in the memory 28 for optical disks of respective record material series. After the test recording, the test signals are reproduced and the record material series providing the best signal quality is selected. After the record material series is selected, next test recording (indicated at (b) in FIG. 11) is sequentially performed by using all record strategies prepared and stored in the memory 28 for the disks having the selected record material series. In this case, a record power providing a relatively good signal quality is judged from the results of the first test recording (indicated at (a) in FIG. 11). The record power is changed in the limited range around the judged record power (i.e., at the limited number of steps). After the completion of the next test recording (indicated at (b) in FIG. 11), the test signals are reproduced and the record strategy providing the best average of signal qualities at respective record velocities is selected. By using the selected best record strategy, as indicated at (c) in FIG. 11 the retest recording is performed by changing the record power in the wide range same as that of the first test recording (indicated at (a) in FIG. 11). After the retest recording, test signals are reproduced to judge the signal quality. If the signal quality is judged good, the optimum record power is obtained from the measurement results of the retest recording (indicated at (c) in FIG. 11) and actual data is recorded. If the signal quality is judged bad, CAV actual data recording is stopped.

In the above description, CAV recording is performed by selecting one record strategy. Instead, the record strategy may be changed in accordance with the record velocity gradually changing in CAV recording. One method of changing the record strategy will be described with reference to FIG. 12. It is assumed that the record velocity changes in the range from 8× to 12× of the standard velocity during CAV recording, and that the best record strategy STR (8×) at the velocity of 8× is different from the best record strategy STR (12×) at the velocity of 12×. The original record signal waveform (indicated at (a) in FIG. 12) is adjusted by the record strategy STR (8×) during 8× recording on the disk inner circumference side as indicated at (b) in FIG. 12. In this example, the time axis adjustment amount near at the waveform rising edge is 8 nsec at 3T and 4 nsec at 11T. The original record signal waveform is adjusted by the record strategy STR (12×) during 12× recording on the disk outer circumference side as indicated at (d) in FIG. 12. In this example, the time axis adjustment amount near at the waveform rising edge is 4 nsec at 3T and 8 nsec at 11T. In the intermediate area, the original record signal waveform is adjusted by the record strategy obtained through stepwise interpolation of the record strategies STR (8×) and STR (12×) at each record velocity magnification factor, as indicated at (c) in FIG. 12. Since the record strategy can be changed slowly through interpolation, interpolation values of the record strategy can be sequentially calculated by the microcomputer 26 during CAV actual data recording to renew at a proper timing the record strategy to be set to the record strategy circuit 20.

In this embodiment, as information of the waveform adjustment amount, information of the time axis adjustment amount is used. Other information such as the amplitude and width of a pulse (called a power addition pulse, top power addition pulse or the like) to be partially added to the waveform may be additionally used. In this embodiment, although the invention is applied to optical disks of the CD standards, the invention is also applicable to optical disks of other standards of mark length record types such as the DVD standards.

The present invention has been described in connection with the preferred embodiments. The invention is not limited only to the above embodiments. It is apparent that various modifications, improvements, combinations, and the like can be made by those skilled in the art.

What are claimed are:

1. An optical disk recording method of recording data in an optical disk by preparing, for each of a plurality of disk types, data of a waveform adjustment amount to be added to a record signal in accordance with the length of the record signal, the method comprising the steps of:

(a) performing test recording for an optical disk whose data of the waveform adjustment amount is not prepared, by using the waveform adjustment amounts for all the disk types or a plurality of properly adopted disk types and by changing a record power;

(b) reproducing test signals recorded by the test recording;

(c) judging the qualities of the reproduced test signals;

(d) selecting the waveform adjustment amount providing a relatively high signal quality;

(e) adjusting the record signal by the selected adjustment amount; and (f) recording the adjusted record signal in the optical disk.

2. An optical disk recording method according to claim 1, wherein said steps (a) and (b) are performed: first by using representative waveform adjustment amounts for each of record material series; and next by using a plurality of waveform adjustment amounts prepared for the disk types belonging to the record material series providing a relatively high signal quality as judged from the results of the first test recording.

3. An optical disk recording method according to claim 1, wherein judging the signal quality of the reproduced test signals is performed by measuring an area surrounded by an abscissa and an each curve of the characteristics of a C1 error rate relative to an asymmetry value β sliced at a slice level of a certain C1 error rate value, or by measuring an area surrounded by an abscissa and an each curve of the characteristics of a jitter value relative to an asymmetry value β sliced at a slice level of a certain jitter value, and by judging that the signal quality is relatively higher as the area is larger.

4. An optical disk recording method according to claim 1, wherein the selected waveform adjustment amount together with identification information of the optical disk is stored in a memory, and if an optical disk used thereafter has the same identification information, the test recording is performed by using the waveform adjustment amount stored in the memory.

5. An optical disk recording method of recording data in an optical disk by preparing, for each of a plurality of disk types, data of a waveform adjustment amount to be added to a record signal in accordance with the length of the record signal, the method comprising the steps of:
(a) performing first test recording for an optical disk whose data of the waveform adjustment amount is prepared, by using the prepared waveform adjustment amount and by changing a record power;
(b) reproducing test signals recorded by the first test recording;
(c) if a record power providing a predetermined signal quality exists, adjusting the record signal by the waveform adjustment amount providing the predetermined signal quality and recording the adjusted record signal in the optical disk;
(d) if a record power providing the predetermined signal quality does not exist, performing second test recording by using the prepared waveform adjustment amounts and by changing the record power;
(e) reproducing test signals recorded by the second test recording;
(f) judging the signal quality of the reproduced test signals;
(g) selecting the waveform adjustment amount providing a relatively high signal quality;
(h) adjusting the record signal by the selected waveform adjustment amount; and
(i) recording the adjusted record signal in the optical disk.

6. An optical disk recording method according to claim 5, wherein if a record power providing the predetermined signal quality does not exist, the second test recording is performed by using the waveform adjustment amounts prepared for the disk types belonging to the same record material series as that of the optical disk to be recorded.

7. An optical disk recording method according to claim 5, wherein if a record power providing the predetermined signal quality does not exist after the first test recording, the second test recording is performed by changing the record power in a limited range of the record power providing a relatively good signal quality in the first test recording, the waveform adjustment amount providing a relatively high signal quality is selected from the results of the second test recording, and the record signal is adjusted by the selected waveform adjustment amount and thereafter recorded in the optical disk.

8. An optical disk recording method of recording data in an optical disk by preparing, for each of a plurality of disk types, data of a waveform adjustment amount to be added to a record signal in accordance with the length of the record signal, the method comprising the steps of:
(a) in CAV-recording an optical disk with prepared data of the waveform adjustment amount and an optical disk without prepared data of the waveform adjustment amount, performing test recording by using the waveform adjustment amounts for all the disk types or a plurality of properly adopted disk types and by changing a record power at each of a plurality of record velocities;
(b) reproducing test signals recorded by the test recording;
(c) judging the qualities of the reproduced test signals;
(d) selecting the waveform adjustment amount providing a relatively high average of signal qualities at respective record velocities;
(e) adjusting the record signal by the selected adjustment amount; and
(f) CAV-recording the adjusted record signal in the optical disk.

9. An optical disk recording method of recording data in an optical disk by preparing, for each of a plurality of disk types, data of a waveform adjustment amount to be added to a record signal in accordance with the length of the record signal, the method comprising the steps of:
(a) in-CAV recording an optical disk with prepared data of the waveform adjustment amount and an optical disk without prepared data of the waveform adjustment amount, performing test recording by using the waveform adjustment amounts for all the disk types or a plurality of properly adopted disk types and by changing a record power at each of a plurality of record velocities;
(b) reproducing test signals recorded by the test recording;
(c) judging the qualities of the reproduced test signals;
(d) selecting the waveform adjustment amount providing a relatively high signal quality at each of the record velocities;
(e) adjusting the record signal at each record velocity by the adjustment amount obtained through interpolation of a plurality of selected waveform adjustment amounts; and
(f) CAV-recording the adjusted record signal in the optical disk.

* * * * *